United States Patent
Xu et al.

(10) Patent No.: US 11,242,450 B2
(45) Date of Patent: *Feb. 8, 2022

(54) RUBBER COMPOSITION, PROCESSING METHOD THEREOF, AND FLAME-RETARDANT PRODUCT USING THE SAME

(71) Applicant: HANGZHOU XINGLU TECHNOLOGIES CO., LTD, Zhejinag (CN)

(72) Inventors: Tao Xu, Hangzhou (CN); Zhisheng Fu, Hangzhou (CN); Anyang Wu, Hangzhou (CN)

(73) Assignee: HANGZHOU XINGLU TECHNOLOGIES CO., LTD, Zhejiang (CN)

( * ) Notice: Subject to any disclaimer, the term of this patent is extended or adjusted under 35 U.S.C. 154(b) by 79 days.

This patent is subject to a terminal disclaimer.

(21) Appl. No.: 16/477,523

(22) PCT Filed: Jan. 12, 2018

(86) PCT No.: PCT/CN2018/072369
§ 371 (c)(1),
(2) Date: Jul. 11, 2019

(87) PCT Pub. No.: WO2018/130197
PCT Pub. Date: Jul. 19, 2018

(65) Prior Publication Data
US 2019/0338109 A1    Nov. 7, 2019

(30) Foreign Application Priority Data

Jan. 13, 2017   (CN) .......................... 201710024885.2
Jan. 10, 2018   (CN) .......................... 201810020840.2

(51) Int. Cl.
| | |
|---|---|
| *C08L 23/06* | (2006.01) |
| *C08K 3/014* | (2018.01) |
| *C08K 3/011* | (2018.01) |
| *C08K 3/013* | (2018.01) |
| *C08K 3/06* | (2006.01) |
| *C08K 5/14* | (2006.01) |
| *C08L 23/16* | (2006.01) |
| *C08K 3/02* | (2006.01) |
| *C08K 3/22* | (2006.01) |

(52) U.S. Cl.
CPC .............. *C08L 23/06* (2013.01); *C08K 3/011* (2018.01); *C08K 3/013* (2018.01); *C08K 3/014* (2018.01); *C08K 3/06* (2013.01); *C08K 5/14* (2013.01); *C08L 23/16* (2013.01); *C08K 2003/026* (2013.01); *C08K 2003/2224* (2013.01); *C08K 2003/2227* (2013.01); *C08L 2201/02* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 4,722,858 A | * | 2/1988 | Harbourne | C08K 3/22 428/220 |
| 4,762,882 A | * | 8/1988 | Okano | C08F 255/02 525/282 |
| 5,057,367 A | * | 10/1991 | Morii | C08K 3/22 428/389 |
| 9,962,906 B1 | * | 5/2018 | Maguire | B32B 7/06 |
| 10,040,888 B1 | * | 8/2018 | Gopalan | B60J 10/16 |
| 2011/0005042 A1 | * | 1/2011 | Thomas | A44B 19/34 24/381 |
| 2013/0306351 A1 | * | 11/2013 | Lambert | H01B 3/44 174/120 SC |

FOREIGN PATENT DOCUMENTS

| | | | |
|---|---|---|---|
| CN | 103980596 | * | 11/2015 |
| CN | 105017658 | * | 11/2015 |

OTHER PUBLICATIONS

Machine Translation of Li et al. CN 103980596 p. 1-6 (Year: 2015).*
Machine Translation of Ying et al. CN 105017658 (Year: 2015).*

* cited by examiner

*Primary Examiner* — Robert T Butcher
(74) *Attorney, Agent, or Firm* — Lorenz & Kopf, LLP

(57) ABSTRACT

The present invention discloses a rubber composition, a processing method for obtaining the rubber composition, and application of the composition in processing of flame-retardant products. The rubber composition includes a rubber matrix and essential components. The rubber matrix includes a branched polyethylene with a content represented as A, in which $0 < A \leq 100$, and an EPM and an EPDM with a total content represented as B, in which $0 \leq B < 100$. The essential components include 1.5 to 10 parts of a crosslinking agent and 40 to 300 parts of a flame-retardant agent. The rubber composition can be applied to production of flame-retardant products, such as flame-retardant cable, flame-retardant cool air hose for automobile, flame-retardant sealing strip, high-temperature-resistant flame-retardant conveyor belt, and flame-retardant waterproof coil. The products have good flame-retardant effects and mechanical properties.

20 Claims, No Drawings

RUBBER COMPOSITION, PROCESSING METHOD THEREOF, AND FLAME-RETARDANT PRODUCT USING THE SAME

CROSS REFERENCE TO RELATED APPLICATIONS

The present application is the U.S. national phase of and claims priority to International Patent Application No. PCT/CN2018/072369 filed Jan. 12, 2018, which claims the benefit of priority from China National Application No. 201710024885.2, filed on Jan. 13, 2017 and China National Application No. 201810020840.2, filed on Jan. 10, 2018, the entire content of each of which is incorporated herein by reference into the present disclosure as if fully set forth herein.

TECHNICAL FIELD

The present invention belongs to the field of rubber, in particular to a rubber composition and a processing method thereof, and further to application of the rubber composition in flame-retardant products, and a method for producing flame-retardant products by using the rubber composition. The flame-retardant products include, but are not limited to, flame-retardant cables, flame-retardant cool air hoses for automobiles, flame-retardant sealing strips, high-temperature-resistant flame-retardant conveyor belts, and flame-retardant waterproof coil.

BACKGROUND

The ethylene propylene rubber has good electrical insulation properties, elasticity, heat resistance and weather resistance, and can be widely applied to many fields, such as sealing strips for doors and windows of automobiles, wire and cable materials, waterproof coil, and polymer modification. With the increase of fire safety requirements, at present, more and more occasions require materials with flame resistance while requiring rubber compounds to be low-smoke and non-toxic, without causing secondary damage. However, the ethylene propylene rubber is extremely flammable, and the oxygen index is only 18 to 19%, so it is necessary to add a flame-retardant agent to achieve a flame-retardant effect. However, the addition of the flame-retardant agent may affect the aging resistance and mechanical properties of the rubber compound. How to improve the aging resistance and mechanical properties of the ethylene propylene rubber is a problem.

Ethylene propylene rubber is a kind of synthetic rubber with a saturated molecular backbone, and includes ethylene-propylene monomer (EPM) and ethylene-propylene-diene monomer (EPDM), both of which have good aging resistance. The EPDM is commonly used in ethylene propylene rubber products. However, since the EPDM contains a third monomer with a molecular chain having a double bond and the EPM has a completely saturated molecular chain, the EPM has more excellent aging resistance. Therefore, in a situation where a higher requirement is raised for the aging resistance, it is a common technical solution to use the EPM in combination to improve the aging resistance of the EPDM. However, the mechanical strength of the EPM is low, which affects the overall physical and mechanical properties.

The EPM is a copolymer of ethylene and propylene, which is a copolymer of ethylene and α-olefin. The copolymer of ethylene and α-olefin is a polymer containing only carbon and hydrogen elements and having a saturated molecular chain. The common types of carbon atoms found in such polymers generally include primary carbon, secondary carbon and tertiary carbon, in which the tertiary carbon atoms are most susceptible to hydrogen abstraction to form free radicals. Accordingly, the proportion of the tertiary carbon atoms in all carbon atoms is generally considered to be a main factor affecting the aging resistance of the copolymer of ethylene and α-olefin. The lower the proportion is, the better the aging resistance will be. The proportion can be expressed by the degree of branching. For example, the EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. The EPM usually has an ethylene content of 40 to 65% or 40 to 60% by weight, so the degree of branching is generally in the range of 117 to 200 branches/1000 carbon atoms or 133 to 200 branches/1000 carbon atoms. This degree of branching is considered to be higher than that of other common copolymers of ethylene and α-olefin.

In the prior art, the α-olefin in the common copolymers of ethylene and α-olefin may include, in addition to propylene, α-olefin having a carbon atom number of not less than 4, which may be selected from $C_4$-$C_{20}$ α-olefin, and is generally selected from 1-butylene, 1-hexene and 1-octylene. If the degree of branching of a copolymer of ethylene and α-olefin is too low, the melting point and the crystallinity are too high, so it is not suitable for use as a rubber component. If the degree of branching is too high, the content of α-olefin is higher, which leads to higher process difficulty and raw material cost, and lower operability and economical efficiency. In the prior art, polyolefin obtained by copolymerizing ethylene with 1-butylene or ethylene with 1-octylene can be referred to as a polyolefin plastomer or a polyolefin elastomer according to the magnitudes of crystallinity and melting points. Due to their proper crystallinity and melting points, some polyolefin elastomer brands can be well used in combination with the ethylene propylene rubber and have a lower degree of branching, so they are considered to be an ideal material for improving the aging resistance of the ethylene propylene rubber, and can be used in place of the ethylene propylene rubber to some extent. Since a copolymer of ethylene and 1-butylene has more flexible molecular chain, higher rubber elasticity, and better physical and mechanical properties than a copolymer of ethylene and 1-octylene, the polyolefin elastomer commonly used in rubber products is generally a copolymer of ethylene and 1-octylene at present, in which the octylene content in percentage by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of the EPM. Therefore, the copolymer of ethylene and 1-butylene has excellent aging resistance and good physical and mechanical properties.

The rubber are usually used after crosslinking. Among common crosslinking methods for the ethylene propylene rubber, peroxide crosslinking or radiation crosslinking can be suitably used for the copolymer of ethylene and α-olefin, both of which mainly comprise: forming a tertiary carbon free radical by hydrogen abstraction from tertiary carbon and then creating a carbon-carbon crosslink by free radical bonding. However, the copolymer of ethylene and 1-octylene (hereinafter referred to as POE) has a small number of tertiary carbon atoms and has long branches attached to the tertiary carbon atoms, so the steric hindrance is large, and a free radical reaction is difficult to occur, resulting in difficulty in crosslinking, thus affecting the processing efficiency and product properties. For example, the compression set resistance is unsatisfactory.

Therefore, there is currently a need for a better technical solution, which can improve the aging resistance of the ethylene propylene rubber while the rubber composition has better physical and mechanical properties and crosslinking properties.

In addition, a traditional halogen-containing flame-retardant system has the advantages of low filling amount, excellent flame-retardant effect and small loss of mechanical properties, but will generate dense smoke and toxic gases during burning, which causes secondary damage and does not comply with the Rosh instruction of the European Union. Metal hydroxide is an important means to prepare a low-smoke and halogen-free flame-retardant agent, is rich in source and low in price, but is poor in flame-retardant effect, large in addition amount and great in influence on the mechanical properties of products. In order to solve the problems, the existing various technologies are implemented mainly by adding additives which are favorable for improving the interface action between the ethylene propylene rubber and the metal hydroxide or adding synergistic flame-retardant agents to reduce the addition amount of the metal hydroxide. However, the problems of unobvious effect improvement, increased cost, difficulty in realizing balance among mechanical properties, flame resistance and extrusion processability, and the like will be caused.

SUMMARY

In view of the problems existing in the prior art, the present invention provides a rubber composition and a processing method thereof. The branched polyethylene having a degree of branching of not less than 50 branches/1000 carbon atoms is used for replacing a part or all of the ethylene propylene rubber, and peroxide vulcanization is used. The present invention also provides a production method for producing flame-retardant products by using the rubber composition, thereby improving the technological difficulty in existing rubber production that products are difficult to have both good flame-retardant effects and mechanical properties.

In order to achieve the above objectives, the present invention adopts the following technical solution: a rubber composition is provided and includes a rubber matrix and essential components, wherein in parts by weight, the rubber matrix includes a branched polyethylene with a content represented as A, in which $0 < A \leq 100$, and an EPM and an EPDM with a total content represented as B, in which $0 \leq B < 100$; based on 100 parts by weight of the rubber matrix, the essential components include 1.5 to 10 parts of a crosslinking agent and 40 to 300 parts of a flame-retardant agent; and the branched polyethylene has a degree of branching of not less than 50 branches/1000 carbon atoms, a weight average molecular weight of not less than 50,000, and a Mooney viscosity ML(1+4) at 125° C. of not less than 2.

"Branched polyethylene" in the prior art can also refer to a saturated vinyl copolymer with branches in addition to an ethylene homopolymer with branches, such as an ethylene-α-olefin copolymer, which can be POE. Although the POE performs well in physical and mechanical properties and aging resistance, the crosslinking properties are poor. Therefore, although the branched polyethylene of the present invention can include both a branched ethylene homopolymer and the POE, it is preferred that the branched polyethylene includes a high proportion of or exclusively a branched ethylene homopolymer. In a preferred technical solution of the present invention, the branched polyethylene includes exclusively a branched ethylene homopolymer.

In the further elaboration of the technical solution of the present invention, unless otherwise specified, the used branched polyethylene is a branched ethylene homopolymer.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method mainly comprises the step of catalyzing ethylene homopolymerization based on a "chain walking mechanism" in the presence of a late transition metal catalyst. Preferably, the late transition metal catalyst is an (α-diimine) nickel/palladium catalyst. The nature of the chain walking mechanism refers to the fact that a β-hydrogen elimination reaction and a re-insertion reaction tend to occur in a process of catalyzing olefin polymerization in the presence of a late transition metal catalyst, such as an (α-diimine) nickel/palladium catalyst, thereby generating branches. The branches of the branched polyethylene based on the backbone may have different numbers of carbon atoms, and specifically 1 to 6 or more carbon atoms.

The production cost of the (α-diimine) nickel catalyst is significantly lower than that of the (α-diimine) palladium catalyst, and the (α-diimine) nickel catalyst has a high rate and high activity in catalyzing ethylene polymerization, and is thus more suitable for industrial application. Therefore, in the present invention, the (α-diimine) nickel catalyst is preferably used in preparation of the branched polyethylene by catalyzing ethylene polymerization.

The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching of the branched polyethylene used in the present invention is between the degree of branching of the POE and the degree of branching of the EPM, constituting a new technical solution that is different from the prior art. Therefore, the rubber matrix of present invention has both excellent aging resistance and good crosslinking properties.

The crosslinking properties include factors such as crosslinking density and crosslinking rate, and are the specific properties of the crosslinking capability of the rubber matrix in the manufacturing process.

The branched polyethylene used in the present invention preferably has a methyl branch content of 40% or more or 50% or more, and has a similarity in structure with the EPM. In terms of the crosslinking capability, the degree of branching (the content of tertiary carbon atoms) and the steric hindrance around the tertiary carbon atoms are the two main factors affecting the crosslinking capability of saturated polyolefin. Compared with the EPM, the branched polyethylene used in the present invention has a lower degree of branching, and since the branched polyethylene has branches with the carbon number of not less than 2, the steric hindrance around the tertiary carbon atoms of the branched polyethylene used in the present invention is theoretically greater than that of the EPM. Taking the two factors into account, it can be inferred that the crosslinking capability of the branched polyethylene used in the present invention is weaker than that of the EPM and further weaker than that of the EPDM. However, the actual crosslinking capability of the partially branched polyethylene used in the present invention is close to, and can even be equal to or better than that of the EPDM. This means that the rubber composition of the present invention can achieve good aging resistance while the crosslinking capability is not weakened, and can even have excellent crosslinking properties to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a crosslinking reaction is more likely to occur. Having a secondary branch structure is a significant distinction of the branched polyethylene used in the preferred technical solution of the present invention from the EPM or the conventional ethylene-α-olefin copolymer in the prior art.

It is a new technical solution to improve the crosslinking capability of a saturated polyolefin elastomer by using the secondary branch structure with lower steric hindrance. According to the technical solution of the present invention, it is also considered to be within the technical protection scope of the present invention to include a vinyl copolymer having a secondary branch structure or other saturated hydrocarbon polymers in the rubber matrix. The vinyl copolymer refers to a copolymer of ethylene and α-olefin with branches and has a secondary branch structure, wherein the α-olefin with branches may be selected from isobutylene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, 6-methyl-1-heptene and the like, and the comonomer may also simultaneously include common linear chain α-olefin.

It is generally believed in the prior art that the branched polyethylene prepared in the presence of the (α-diimine) nickel catalyst is difficult to have a secondary branch structure that is at least difficult to fully identify, and the technical solution of the present invention also provides a new idea for analyzing the structure of the branched polyethylene.

Compared with the ethylene propylene rubber, when the branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the backbones than the ethylene propylene rubber, which can effectively avoid the stress concentration, and there is hope of better mechanical properties while having good crosslinking efficiency.

In a further technical solution, 100 parts by weight of the rubber matrix includes a branched polyethylene with a content represented as A, in which 10≤A≤100, and an EPM and an EPDM with a total content represented as B, in which 0≤B≤90, and the branched polyethylene is an ethylene homopolymer having a degree of branching of 60 to 130 branches/1000 carbon atoms, a weight average molecular weight of 66,000 to 518,000, and a Mooney viscosity ML(1+4) at 125° C. of 6 to 102.

In a further technical solution, 100 parts by weight of the rubber matrix includes a branched polyethylene with a content represented as A, in which 10≤A≤100, and an EPM and an EPDM with a total content represented as B, in which 0≤B≤90, and the branched polyethylene is an ethylene homopolymer having a degree of branching of 70 to 116 branches/1000 carbon atoms, a weight average molecular weight of 201,000 to 436,000, and a Mooney viscosity ML(1+4) at 125° C. of 23 to 101.

In a further technical solution, 100 parts by weight of the rubber matrix includes a branched polyethylene with a content represented as A, in which 10≤A≤100, and an EPM and an EPDM with a total content represented as B, in which 0≤B≤90, and the branched polyethylene is an ethylene homopolymer having a degree of branching of 80 to 105 branches/1000 carbon atoms, a weight average molecular weight of 250,000 to 400,000, and a Mooney viscosity ML(1+4) at 125° C. of 40 to 95.

In a further technical solution, 100 parts by weight of the rubber matrix includes a branched polyethylene with a content represented as A, in which 10≤A≤100, and an EPM and an EPDM with a total content represented as B, in which 0≤B≤90, and the branched polyethylene is an ethylene homopolymer having a degree of branching of 80 to 105 branches/1000 carbon atoms, a weight average molecular weight of 268,000 to 356,000, and a Mooney viscosity ML(1+4) at 125° C. of 42 to 80.

In a further technical solution, a third monomer of the EPDM is preferably a diene monomer and specifically can be selected from 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylene-2-norbornene, 1,5-cyclooctadiene, 1,4-cyclooctadiene, and the like. Particularly, the ethylene propylene rubber can simultaneously include two or more diene monomers. For example, the ethylene propylene rubber can simultaneously include 5-ethylidene-2-norbornene and 5-vinyl-2-norbornene. The functional group of the diene monomer can play the same role as an intrinsic auxiliary crosslinking agent in peroxide vulcanization to improve the crosslinking efficiency, thereby being favorable for reducing the dosage and residual quantity of the required crosslinking agents and auxiliary crosslinking agents and lowering the cost required for adding the crosslinking agents and the auxiliary crosslinking agents. The weight ratio of the diene monomer in the ethylene propylene rubber is preferably 1% to 14%, more preferably 3% to 10%, and further preferably 4% to 7%.

In a further technical solution, the crosslinking agent includes at least one of a peroxide crosslinking agent and sulfur.

In a further technical solution, the peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

In a further technical solution, based on 100 parts by weight of the rubber matrix, the content of the crosslinking agent is 2 to 8 parts.

In a further technical solution, based on 100 parts by weight of the rubber matrix, the content of the flame-retardant agent is 60 to 200 parts.

In a further technical solution, the flame-retardant agent includes at least one of aluminum hydroxide, magnesium hydroxide, zinc borate, antimonous oxide, zinc stearate, titanate, decabromodiphenyl oxide, silane coupling agent modified hydroxide, and red phosphorus.

In a further technical solution, the aluminum hydroxide, the magnesium hydroxide, and the silane coupling agent modified hydroxide are respectively nano aluminum oxide, nano magnesium hydroxide, and silane coupling agent modified nano hydroxide, and the red phosphorus is microencapsulated red phosphorus.

In a further technical solution, the rubber composition also includes auxiliary components, and based on 100 parts by weight of the rubber matrix, the auxiliary components include, in parts by weight, 0.2 to 10 parts of an auxiliary crosslinking agent, 10 to 150 parts of a reinforcing filler, 5 to 80 parts of a plasticizer, 1 to 3 parts of a stabilizer, 2 to 10 parts of a metal oxide, 1 to 2 parts of a silane coupling agent, 1 to 100 parts of unsaturated carboxylic acid, and 0 to 3 parts of a vulcanization accelerator.

In a further technical solution, the auxiliary crosslinking agent includes at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene)acetone, 1,2-polybutadiene, a metal salt of unsaturated carboxylic acid, and sulfur.

In a further technical solution, the metal salt of unsaturated carboxylic acid includes at least one of zinc acrylate, zinc methacrylate, and magnesium methacrylate.

In a further technical solution, the reinforcing filler includes at least one of carbon black, silica, calcium carbonate, talcum powder, calcined clay, and magnesium carbonate, and the calcined clay is zinc stearate or titanate or silane coupling agent modified calcined clay.

In a further technical solution, the plasticizer includes at least one of pine tar, engine oil, naphthenic oil, paraffin oil, coumarone, RX-80, stearic acid, and paraffin, wherein the stearic acid can also play a role of an activator in a sulfur vulcanization-based system and can be combined with some metal oxides to form a soluble salt so as to increase the activation of the metal oxide to the accelerator. The reasonable use of the plasticizer can increase the elasticity of the rubber compound and the plasticity suitable for technological operation. In order to increase the adhesion, additives with a tackifying effect, such as pine tar, coumarone and RX-80, can also be used preferably.

In a further technical solution, the stabilizer includes at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

In a further technical solution, the metal oxide includes at least one of zinc oxide, magnesium oxide, and calcium oxide.

In a further technical solution, the silane coupling agent includes at least one of vinyl tris(2-methoxyethoxy)silane (A-172), γ-glycidyloxypropyl trimethoxysilane (A-187), and γ-mercaptopropyl trimethoxysilane (A-189).

In a further technical solution, the unsaturated carboxylic acid includes at least one of methacrylic acid, acrylic acid, and undecylenic acid.

In a further technical solution, the vulcanization accelerator includes at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazolesulfenamide, bismaleimide, and ethylene thiourea.

In an embodiment of the present invention, in order to improve the adhesion of the rubber compound, the rubber composition can further include a tackifier. The aforementioned pine tar, coumarone resin, and RX-80 for the plasticizer also have a tackifying effect. Liquid coumarone resin has a better tackifying effect than solid coumarone resin. The tackifier can also be selected from C5 petroleum resin, C9 petroleum resin, liquid polyisobutylene, hydrogenated rosin, terpine resin, alkyl phenolic resin, modified alkyl phenolic resin, alkylphenol-acetylene resin, and other commonly used tackifiers. Based on 100 parts by weight of the rubber matrix, the tackifier is usually used in an amount of not more than 30 parts by weight, further preferably not more than 10 parts by weight, and further preferably not more than 5 parts by weight.

The crosslinking agent, the auxiliary crosslinking agent and the vulcanization accelerator involved in the rubber composition provided by the present invention all belong to a crosslinking system.

The rubber composition of the present invention can exist in a form of an uncrosslinked rubber mix, and can exist in a form of vulcanized rubber after a further crosslinking reaction. The vulcanized rubber can also be simply referred to vulcanizate.

The present invention also provides a processing method for obtaining the rubber composition. The processing method comprises the following steps:

(1) rubber mixing: firstly, sequentially adding other components of the rubber composition than the crosslinking system to an internal mixer according to parts by weight and performing mixing, then, adding the crosslinking system and performing mixing uniformly, discharging a rubber mix, plasticating the rubber mix on an open mill, then, unloading a sheet, and allowing the sheet to stand for vulcanization, wherein the crosslinking system includes a crosslinking agent and can also include at least one of an auxiliary crosslinking agent and a vulcanization accelerator;

(2) vulcanization: filling the rubber mix into a cavity of a mold, vulcanizing the rubber mix on a press vulcanizer by pressing, and releasing the vulcanized product from the mold to obtain vulcanized rubber. In order to improve the compression set resistance of the vulcanized rubber, a post vulcanization process can be further used for vulcanization.

The present invention also provides a flame-retardant wire/cable, and an insulating layer or a sheath layer of the flame-retardant wire/cable includes the rubber composition.

The present invention also provides a method for producing the flame-retardant wire/cable. The production method comprises the following steps: (1) performing stranding; (2) extruding a rubber insulating layer; (3) performing vulcanization; (4) performing a spark high-pressure test to obtain a wire; (5) further processing the wire into a cable; (6) extruding a rubber sheath; (7) performing vulcanization; (8) performing lettering; (9) obtaining a finished cable.

The mixing process of the rubber compound used for the insulating layer or the sheath layer of the wire/cable comprises the following steps: firstly, sequentially adding other components of the rubber composition than the crosslinking system to an internal mixer according to parts by weight and performing mixing, then, adding the crosslinking system and performing mixing uniformly, and discharging a rubber mix for later use, wherein the crosslinking system includes a crosslinking agent and can also include at least one of an auxiliary crosslinking agent and a vulcanization accelerator.

The present invention also provides a flame-retardant cool air hose for automobiles, and the rubber compound used for the flame-retardant cool air hose includes the rubber composition.

The present invention also provides a method for producing the flame-retardant cool air hose for automobiles. The processing method comprises the following steps: firstly, sequentially adding other components of the rubber composition than the crosslinking system to an internal mixer according to parts by weight and performing mixing, then, adding the crosslinking system and performing mixing uniformly, and discharging a rubber mix for later use. wherein the crosslinking system includes a crosslinking agent and can also include at least one of an auxiliary crosslinking agent and a vulcanization accelerator; allowing the rubber mix to stand for a period of time, then, putting the rubber mix into an extruder so as to be extruded, and vulcanizing the extruded product in a nitrogen-filled vulcanization tank to obtain the flame-retardant cool air hose for automobiles.

The present invention also provides a flame-retardant sealing strip, and the rubber compound used includes the rubber composition.

The present invention also provides a method for producing the flame-retardant sealing strip. The production method comprises the following steps:

(1) mixing: firstly, sequentially adding other components of the rubber composition than the crosslinking system to an internal mixer according to parts by weight and performing mixing, then, adding the crosslinking system and performing mixing uniformly, and discharging a rubber mix for later use, wherein the crosslinking system includes a crosslinking agent and can also include at least one of an auxiliary crosslinking agent and a vulcanization accelerator; automatically discharging the rubber mix to a double screw extruder so as to be extruded into a sheet, continuously cooling the rubber mix in a rubber sheet cooling machine, and automatically discharging the rubber mix to a pallet so as to be packaged and formed after the rubber mix is cooled to room temperature;

(2) extrusion and vulcanization: in extrusion and vulcanization processes, performing extrusion by using a vacuumizing extruder, then, performing vulcanization by using a salt bath vulcanization process, and cooling the vulcanized product to obtain the flame-retardant sealing strip.

The present invention also provides a flame-retardant conveyor belt, having working surface covering rubber and non-working surface covering rubber, at least one which uses the rubber composition provided by the present invention.

The present invention also provides a method for producing the flame-retardant conveyor belt, the working surface covering rubber of the conveyor belt uses the rubber composition provided by the present invention, and the production method comprises the following steps:

(1) mixing: firstly, sequentially adding the components of other rubber composition than the crosslinking system to an internal mixer according to parts by weight and performing mixing, then, adding the crosslinking system and performing mixing uniformly, and discharging a rubber mix for later use, wherein the crosslinking system includes a crosslinking agent and can also include at least one of an auxiliary crosslinking agent and a vulcanization accelerator;

(2) calendering process: putting the rubber mix into a screw extruder so as to be subjected to hot milling, then, conveying the rubber mix into a calender so as to be calendered, and discharging a sheet for later use;

(3) forming process: closely attaching the rubber sheet and a preformed rubberized canvas belt blank together on a forming machine to form a belt blank of a high-temperature-resistant flame-retardant conveyor belt, coiling the belt blank, allowing the coiled belt blank to stand, and then, vulcanizing the belt blank;

(4) vulcanization process: putting the formed belt blank of the conveyor belt into a press vulcanizer so as to be vulcanized in sections;

(5) trimming and inspecting: perfroming trimming and inspecting, and then, perfroming packaging and warehousing.

The present invention also provides a flame-retardant waterproof coil, and the rubber compound used for the flame-retardant waterproof coil includes the rubber composition.

The present invention also provides a method for producing the flame-retardant waterproof coil. The production method comprises the following steps:

(1) mixing: firstly, sequentially adding other components of the rubber composition than the crosslinking system to an internal mixer according to parts by weight and performing mixing, then, adding the crosslinking system and performing mixing uniformly, discharging a rubber mix for later use, conveying a blocky rubber compound into an open mill and performing mixing to obtain a rubber sheet of which the surface is smooth, uniform and glossy, cooling the rubber sheet to 50° C. or below, and then, discharging and stacking the sheet, wherein the crosslinking system includes a crosslinking agent and can also include at least one of an auxiliary crosslinking agent and a vulcanization accelerator;

(2) hot milling: performing hot milling on the uniformly-mixed rubber sheet on an open mill until the rubber compound sheet is smooth and uniform, and then, preliminarily coiling the rubber compound sheet;

(3) calendering: putting the rubber sheet which is preliminarily coiled by means of hot milling on a calender, and adjusting the roller spacing according to the thickness requirement of a finished product to perform calendering so as to obtain a semi-finished coil meeting the thickness specification requirement of the finished product;

(4) coiling: sandwiching an isolation liner layer according to the specification length requirement of the finished coil, and tidying the semi-finished coil into a coil;

(5) vulcanization: putting the coil which is tidied into the coil into a vulcanization kettle so as to be vulcanized;

(6) recoiling: uncoiling the vulcanized coil again, taking out the isolation liner layer, and then, recoiling and packaging the coil to obtain a product.

Compared with the prior art, a new low-smoke, halogen-free and flame-retardant rubber composition provided by the present invention has the beneficial effects that rubber components are adjusted on the basis of flame-retardant cooperation components, and the branched polyethylene is used for replacing a part of or all of the ethylene propylene rubber, so that the rubber composition provided by the present invention can obtain better mechanical properties and processability on the premise of having the inherent advantages of good aging resistance, good electrical insulation properties and the like of the existing flame-retardant ethylene propylene rubber; furthermore, the branched polyethylene is an ethylene homopolymer with more branches, has a completely saturated molecular chain, and has same good electrical insulation properties, elasticity, heat resistance, weather resistance and other valuable properties as the ethylene propylene rubber; however, the branched polyethylene has more long branches than the ethylene propylene rubber and may have a secondary branch structure, so that the branched polyethylene could have higher crosslinking efficiency and mechanical strength in a crosslinking reaction process; on the other hand, because the branched polyethylene has more long branches, under the same molecular weight, the branched polyethylene has lower hydrodynamic volume, lower Mooney viscosity and better processability; and therefore, when the rubber composition contains the branched polyethylene, the new rubber composition can effectively improve the defects of the prior art and obtain good mechanical properties and processability.

125° C. is 6 to 102. The degree of branching is measured by means of nuclear magnetic hydrogen spectroscopy, and the molar percentages of various branches are measured by means of nuclear magnetic carbon spectroscopy.

Specific details are as follows:

| Branched polyethylene No. | Degree of branching | Methyl/% | Ethyl/% | Propyl/% | Butyl/% | Pentyl/% | Hexyl or higher/% | Weight average molecular weight/10,000 | Molecular weight distribution | Mooney viscosity ML (1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 87 | 61.8 | 10.3 | 5.4 | 4.6 | 4.9 | 12.0 | 40.1 | 1.8 | 101 |
| PER-11 | 94 | 60.5 | 10.8 | 5.7 | 4.7 | 4.9 | 13.3 | 37.8 | 2.0 | 85 |
| PER-12 | 102 | 56.8 | 12.7 | 6.1 | 5.2 | 5.1 | 13.9 | 34.8 | 1.9 | 66 |

DETAILED DESCRIPTION

The present invention is further described through embodiments, but such embodiments are not intended to limit the scope of the present invention. Some non-essential improvements and adjustments made by those skilled in the art to the present invention shall also fall within the protection scope of the present invention.

In order to more clearly describe the embodiments of the present invention, the materials involved in the present invention are defined below.

The crosslinking system includes a crosslinking agent and can also include at least one of an auxiliary crosslinking agent and a vulcanization accelerator.

The Mooney viscosity ML(1+4) at 125° C. of the used EPM is preferably 20 to 50, and the ethylene content is preferably 45% to 60%. The Mooney viscosity ML(1+4) at 125° C. of the used EPDM is preferably 20 to 100 and further preferably 30 to 80, the ethylene content is preferably 55 to 75%, the third monomer is 5-ethylidene-2-norbornene, 5-vinyl-2-norbornene or dicyclopentadiene, and the content of the third monomer is 1% to 7%.

The used branched polyethylene can be obtained by catalyzing ethylene homopolymerization by an (α-diimine) nickel catalyst under the action of a co-catalyst.

The structure and synthesis method of the used (α-diimine) nickel catalyst and the method for preparing the branched polyethylene by the (α-diimine) nickel catalyst are disclosed in the prior art, and can use but are not limited to the following literatures: CN102827312A, CN101812145A, CN101531725A, CN104926962A, U.S. Pat. Nos. 6/103,658, 6/660,677.

The used branched polyethylene has the characteristics that the degree of branching is 60 to 130 branches/1000 carbon atoms, the weight average molecular weight is 66,000 to 518,000, and the Mooney viscosity ML(1+4) at Rubber performance test method:

1. Hardness test: the test is performed by using a hardness tester in accordance with the national standard GB/T 531.1-2008, wherein the test temperature is room temperature.

2. Tensile strength and elongation at break performance test: the test is performed by using an electronic tensile tester in accordance with the national standard GB/T528-2009, wherein the tensile speed is 500 mm/min, the test temperature is 23±2° C., and the sample is a type 2 dumbbell-shaped sample.

3. Mooney viscosity test: the test is performed by using a Mooney viscosity tester in accordance with the national standard GB/T1232.1-2000, wherein the test temperature is 125° C., the preheating time is 1 min, and the test time is 4 min.

4. Hot air accelerated aging test: the test is performed in a heat aging test box in accordance with the national standard GB/T3512-2001, wherein the test condition is 150° C.*72 h.

5. Volume resistivity test: the test is performed by using a megger in accordance with the national standard GB/T1692-2008.

6. The oxygen index is tested in accordance with the national standard GB/T2046.2-2009.

The specific embodiment of the rubber composition provided by the present invention is as follows: the rubber composition includes a rubber matrix and essential components. The rubber matrix includes: A parts of branched polyethylene, in which 0<A≤100, wherein the degree of branching is 60 to 130 branches/1000 carbon atoms, the weight average molecular weight is 66,000 to 518,000, and the Mooney viscosity ML(1+4) at 125° C. is 6 to 102; and B parts of EPM and EPDM, in which 0≤B<100, wherein the Mooney viscosity ML(1+4) at 125° C. is 20 to 50, and the ethylene content is 55% to 75%.

The essential components include 1.5 to 10 parts of a crosslinking agent and 40 to 300 parts of a flame-retardant agent, and preferably, 60 to 200 parts of a flame-retardant agent.

The rubber composition also includes auxiliary components. The auxiliary components include 0.2 to 10 parts of an auxiliary crosslinking agent, 10 to 150 parts of a reinforcing filler, 5 to 80 parts of a plasticizer, 1 to 3 parts of a stabilizer, 2 to 10 parts of a metal oxide, 1 to 2 parts of a silane coupling agent, 1 to 100 parts of unsaturated carboxylic acid, and 0 to 3 parts of a vulcanization accelerator. The flame-retardant agent includes at least one of aluminum hydroxide, magnesium hydroxide, zinc borate, antimonous oxide, zinc stearate, titanate, silane coupling agent modified hydroxide, and red phosphorus.

In a preferred embodiment, the aluminum hydroxide, the magnesium hydroxide, and the silane coupling agent modified hydroxide are respectively nano aluminum oxide, nano magnesium hydroxide, and silane coupling agent modified nano hydroxide, and the red phosphorus is microencapsulated red phosphorus.

The silane coupling agent includes at least one of vinyl tris(2-methoxyethoxy)silane (A-172), γ-glycidyloxypropyl trimethoxysilane (A-187), and γ-mercaptopropyl trimethoxysilane (A-189).

The unsaturated carboxylic acid includes at least one of methacrylic acid, acrylic acid, and undecylenic acid.

The stabilizer includes at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

The auxiliary crosslinking agent includes at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene)acetone, 1,2-polybutadiene, zinc acrylate, zinc methacrylate, magnesium methacrylate, calcium methacrylate, aluminum methacrylate, and sulfur.

The plasticizer includes at least one of pine tar, engine oil, naphthenic oil, paraffin oil, coumarone resin, RX-80, stearic acid, and paraffin. The metal oxide includes at least one of zinc oxide, magnesium oxide, and calcium oxide.

The reinforcing filler includes at least one of carbon black, silica, calcium carbonate, talcum powder, calcined clay, and magnesium carbonate, and the calcined clay is zinc stearate or titanate or silane coupling agent modified calcined clay. The crosslinking agent includes at least one of a peroxide crosslinking agent and sulfur.

The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

The vulcanization accelerator includes at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazolesulfenamide, bismaleimide, and ethylene thiourea.

In order to test the performance of the rubber composition, the specific embodiment of the present invention also provides examples of processing methods of the rubber composition. The examples are as follows:

Example 1

Branched polyethylene No. PER-9 was used.
The processing steps of the rubber composition were as follows:
(1) rubber mixing: the temperature of an internal mixer was set to be 90° C. and the rotor speed was set to be 50 r/min, 90 parts of EPDM and 10 parts of branched polyethylene were added, and pre-pressing and mixing were performed for 90 s; 5 parts of zinc oxide and 3 parts of an anti-aging agent RD were added, and mixing was performed for 1 min; then, 170 parts of zinc stearate modified aluminum hydroxide, 5 parts of zinc borate, 10 parts of antimonous oxide, 2 parts of a silane coupling agent (A-172), 30 parts of calcined clay, and 20 parts of paraffin oil SUN-PAR2280 were added to the rubber compound, and mixing was performed for 3 min; finally, 3 parts of a crosslinking agent dicumyl peroxide (DCP) and 2 parts of an auxiliary crosslinking agent triallyl isocyanurate (TAIC) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 2

Branched polyethylene No. PER-2 was used.
The processing steps of the rubber composition were as follows:
(1) rubber mixing: the temperature of an internal mixer was set to be 90° C. and the rotor speed was set to be 50 r/min, 20 parts of EPM, 50 parts of EPDM, and 30 parts of branched polyethylene were added, and mixing was performed for 90 s; then, 10 parts of zinc oxide and 3 parts of an anti-aging agent RD were added, and mixing was performed for 1 min; 180 parts of aluminum hydroxide, 10 parts of methacrylic acid, 2 parts of a silane coupling agent (A-172), and 20 parts of magnesium carbonate were added to the rubber compound, and mixing was performed for 3 min; finally, 3 parts of a crosslinking agent dicumyl peroxide (DCP) and 2 parts of an auxiliary crosslinking agent triallyl isocyanurate (TAIC) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 3

Branched polyethylene No. PER-4 was used.
The processing steps of the rubber composition were as follows:
(1) rubber mixing: the temperature of an internal mixer was set to be 90° C. and the rotor speed was set to be 50 r/min, 30 parts of EPM and 70 parts of branched polyethylene were added, and pre-pressing and mixing were performed for 90 s; 5 parts of zinc oxide and 3 parts of an anti-aging agent RD were added, and mixing was performed for 1 min; then, 250 parts of silane coupling agent modified aluminum hydroxide, 30 parts of zinc borate, 20 parts of antimonous oxide, and 5 parts of paraffin oil were added to the rubber compound, and mixing was performed for 3 min; finally, 3 parts of a crosslinking agent dicumyl peroxide (DCP) and 2 parts of an auxiliary crosslinking agent triallyl isocyanurate (TAIC) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 4

Branched polyethylene No. PER-5 was used.

The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; 5 parts of zinc oxide and 3 parts of an anti-aging agent RD were added, and mixing was performed for 1 min; then, 200 parts of silane coupling agent modified aluminum hydroxide and 5 parts of paraffin oil SUNPAR2280 were added to the rubber compound, and mixing was performed for 3 min; finally, 3 parts of a crosslinking agent dicumyl peroxide (DCP), 8 parts of an auxiliary crosslinking agent liquid 1,2-polybutadiene, and 2 parts of an auxiliary crosslinking agent triallyl isocyanurate (TAIC) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 5

Branched polyethylene No. PER-3 was used.

The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; then, 200 parts of silane coupling agent modified aluminum hydroxide and 10 parts of paraffin oil SUNPAR2280 were added to the rubber compound, and mixing was performed for 3 min; finally, 1 part of a crosslinking agent dicumyl peroxide (DCP), 0.3 part of an auxiliary crosslinking agent triallyl isocyanurate (TAIC), 0.5 part of a crosslinking agent sulfur, 1 part of N-cyclohexyl-2-benzothiazole sulfenamide (CZ), and 0.8 part of tetramethylthiuram disulfide (TMTD) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 6

Branched polyethylene No. PER-3 was used.

The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; 2 parts of an anti-aging agent RD was added, and mixing was performed for 1 min; then, 200 parts of silane coupling agent modified aluminum hydroxide and 30 parts of methacrylic acid were added to the rubber compound, and mixing was performed for 3 min; finally, 3 parts of a crosslinking agent dicumyl peroxide (DCP) and 2 parts of an auxiliary crosslinking agent triallyl isocyanurate (TAIC) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Comparative Example 1

The processing steps of the rubber composition were as follows:

(1) rubber mixing: the temperature of an internal mixer was set to be 90° C. and the rotor speed was set to be 50 r/min, 100 parts of EPDM was added, and pre-pressing and mixing were performed for 90 s; 5 parts of zinc oxide and 3 parts of an anti-aging agent RD were added, and mixing was performed for 1 min; then, 200 parts of silane coupling agent modified aluminum hydroxide and 10 parts of paraffin oil SUNPAR2280 were added to the rubber compound, and mixing was performed for 3 min; finally, 3 parts of a crosslinking agent dicumyl peroxide (DCP) and 2 parts of an auxiliary crosslinking agent triallyl isocyanurate (TAIC) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Performance test data of Examples 1 to 6 and Comparative example 1

| Test item | Comparative example 1 | Example 1 | Example 2 | Example 3 | Example 4 | Example 5 | Example 6 |
|---|---|---|---|---|---|---|---|
| Hardness | 75 | 81 | 74 | 77 | 72 | 73 | 77 |
| Tensile strength/MPa | 6.6 | 7.6 | 9.8 | 10.6 | 12.5 | 11.6 | 14.5 |
| Elongation at break/% | 230 | 218 | 256 | 214 | 288 | 292 | 234 |
| Oxygen index/% | 32 | 35 | 31 | 36 | 32 | 32 | 33 |
| Volume resistivity/Ω · cm | $4.1 \times 10^{14}$ | $4.0 \times 10^{14}$ | $6.8 \times 10^{14}$ | $4.9 \times 10^{14}$ | $5.8 \times 10^{14}$ | $2.6 \times 10^{14}$ | $7.1 \times 10^{14}$ |

-continued

| Test item | Comparative example 1 | Example 1 | Example 2 | Example 3 | Example 4 | Example 5 | Example 6 |
|---|---|---|---|---|---|---|---|
| After aging (150° C.*72 h) | | | | | | | |
| Hardness | 77 | 83 | 76 | 75 | 74 | 75 | 78 |
| Retention rate of tensile strength/% | 105 | 104 | 105 | 103 | 101 | 93 | 103 |
| Retention rate of elongation at break/% | 95 | 96 | 94 | 95 | 96 | 91 | 101 |

Data analysis: comparing Examples 1 to 4 with Comparative example 1, it can be found that as the proportion of the branched polyethylene replacing the ethylene propylene rubber increased, the mechanical strength and volume resistivity of the vulcanized rubber were obviously improved, and the aging resistance and the flame resistance have no obvious change, indicating that the new rubber composition provided by the present invention was suitable for producing flame-retardant cables.

Example 7

Branched polyethylene No. PER-5 was used.
The processing steps of the rubber composition were as follows:
(1) rubber mixing: the temperature of an internal mixer was set to be 90° C. and the rotor speed was set to be 50 r/min, 50 parts of EPDM and 50 parts of branched polyethylene were added, and pre-pressing and mixing were performed for 90 s; 5 parts of zinc oxide, 2 parts of stearic acid, and 2 parts of an anti-aging agent RD were added, and mixing was performed for 1 min; then, 160 parts of silane coupling agent modified aluminum hydroxide, 40 parts of carbon black N550, 20 parts of calcined clay, and 20 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;
(2) vulcanization was performed, the vulcanized product was allowed to stand for 16 h, and then, various tests were performed.

Example 8

Branched polyethylene No. PER-5 was used.
The processing steps of the rubber composition were as follows:
(1) rubber mixing: the temperature of an internal mixer was set to be 90° C. and the rotor speed was set to be 50 r/min, 100 parts of branched polyethylene was added, and pre-pressing and mixing were performed for 90 s; 5 parts of zinc oxide, 2 parts of stearic acid, and 2 parts of an anti-aging agent RD were added, and mixing was performed for 1 min; then, 160 parts of silane coupling agent modified aluminum hydroxide, 40 parts of carbon black N550, 20 parts of calcined clay, and 20 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;
(2) vulcanization was performed, the vulcanized product was allowed to stand for 16 h, and then, various tests were performed.

Example 9

Branched polyethylene No. PER-6 was used.
The processing steps of the rubber composition were as follows:
(1) rubber mixing: the temperature of an internal mixer was set to be 90° C. and the rotor speed was set to be 50 r/min, 70 parts of EPM and 30 parts of branched polyethylene were added, and pre-pressing and mixing were performed for 90 s; 5 parts of zinc oxide, 2 parts of stearic acid, and 2 parts of an anti-aging agent RD were added, and mixing was performed for 1 min; then, 60 parts of silane coupling agent modified aluminum hydroxide, 80 parts of carbon black N550, 30 parts of calcined clay, and 15 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;
(2) vulcanization was performed, the vulcanized product was allowed to stand for 16 h, and then, various tests were performed.

Example 10

Branched polyethylene No. PER-8 was used.
The processing steps of the rubber composition were as follows:
(1) rubber mixing: the temperature of an internal mixer was set to be 90° C. and the rotor speed was set to be 50 r/min, 20 parts of EPM, 30 parts of EPDM, and 50 parts of branched polyethylene were added, and pre-pressing and mixing were performed for 90 s; 5 parts of zinc oxide, 2 parts of stearic acid, and 2 parts of an anti-aging agent RD were added, and mixing was performed for 1 min; then, 160 parts of silane coupling agent modified aluminum hydroxide, 2 parts of a silane coupling agent (A-172), 80 parts of carbon black N550, 40 parts of calcined clay, and 40 parts of paraffin oil SUNPAR2280 were added to the rubber compound, and mixing was performed for 3 min; finally, 10 parts of a crosslinking agent dicumyl peroxide (DCP) and 5 parts of an auxiliary crosslinking agent triallyl isocyanurate (TAIC) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 11

Branched polyethylene Nos. PER-1 and PER-7 were used.

The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; 5 parts of zinc oxide, 2 parts of stearic acid, and 2 parts of an anti-aging agent RD were added, and mixing was performed for 1 min; then, 150 parts of silane coupling agent modified aluminum hydroxide, 5 parts of zinc borate, 10 parts of antimonous oxide, 20 parts of methacrylic acid, 100 parts of carbon black N550, 30 parts of calcined clay, and 70 parts of paraffin oil SUNPAR2280 were added to the rubber compound, and mixing was performed for 3 min; finally, 8 parts of a crosslinking agent dicumyl peroxide (DCP) and 4 parts of an auxiliary crosslinking agent triallyl isocyanurate (TAIC) were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Example 12

Branched polyethylene No. PER-3 was used.
The processing steps of the rubber composition were as follows:

(1) rubber mixing: the temperature of an internal mixer was set to be 90° C. and the rotor speed was set to be 50 r/min, 100 parts of branched polyethylene was added, and pre-pressing and mixing were performed for 90 s; 3 parts of zinc oxide, 1 part of stearic acid, and 2 parts of an anti-aging agent RD were added, and mixing was performed for 1 min; then, 160 parts of silane coupling agent modified aluminum hydroxide, 5 parts of zinc borate, 10 parts of antimonous oxide, 40 parts of carbon black N550, 20 parts of calcined clay, and 10 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

Comparative Example 2

The processing steps of the rubber composition were as follows:

(1) rubber mixing: the temperature of an internal mixer was set to be 90° C. and the rotor speed was set to be 50 r/min, 100 parts of EPDM was added, and pre-pressing and mixing were performed for 90 s; 5 parts of zinc oxide, 2 parts of stearic acid, and 2 parts of an anti-aging agent RD were added, and mixing was performed for 1 min; then, 160 parts of silane coupling agent modified aluminum hydroxide, 40 parts of carbon black N550, 20 parts of calcined clay, and 20 parts of paraffin oil SUNPAR2280 were added to the rubber compound, and mixing was performed for 3 min; finally, 2 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged; the rubber mix was plasticated on an open mill of which the roller temperature was 60° C. to obtain a sheet of which the thickness was about 2.5 mm, the sheet was unloaded, and the sheet was allowed to stand for 20 h;

(2) vulcanization was performed, the vulcanized product was allowed to stand for 16 h, and then, various tests were performed.

| Test item | Comparative example 2 | Example 7 | Example 8 | Example 9 | Laboratory 10 | Example 11 | Example 12 |
|---|---|---|---|---|---|---|---|
| Hardness | 66 | 65 | 64 | 65 | 74 | 73 | 68 |
| Tensile strength/MPa | 8.9 | 11.4 | 14.8 | 11.3 | 12.5 | 13.8 | 10.6 |
| Elongation at break/% | 325 | 347 | 389 | 356 | 259 | 278 | 335 |
| Oxygen index/% | 34 | 34 | 34 | 30 | 33 | 29 | 35 |
| Compression set/%(70° C.*22 h) | 18 | 16 | 13 | 15 | 14 | 11 | 12 |
| After aging (150° C.*72 h) | | | | | | | |
| Hardness | 68 | 66 | 65 | 69 | 75 | 74 | 69 |
| Retention rate of tensile strength/% | 102 | 103 | 102 | 104 | 104 | 99 | 105 |
| Retention rate of elongation at break/% | 91 | 93 | 94 | 97 | 98 | 97 | 94 |

Data analysis: comparing Examples 7 to 12 with Comparative example 2, it can be found that as the proportion of the branched polyethylene replacing the ethylene propylene rubber increased, the mechanical strength of the vulcanized rubber was obviously improved, the compression set was obviously reduced, and the aging resistance and the flame resistance have no obvious change, indicating that the new rubber composition provided by the present invention was suitable for application occasions having requirements for mechanical strength and compression set, such as production of flame-retardant sealing strips, flame-retardant rubber hoses, flame-retardant conveyor belts, flame-retardant rubber plates, and the like.

The embodiment of the present invention also provides an application of the rubber composition. The application refers to production and processing of flame-retardant products. The flame-retardant products include flame-retardant cables, flame-retardant cool air hoses for automobiles, flame-retardant sealing strips, high-temperature-resistant flame-retardant conveyor belts, and flame-retardant waterproof coil.

The examples of production and processing methods of the flame-retardant products were as follows:

Example 13

The present example is a flame-retardant cable. A production process thereof was as follows:
(1) stranding was performed; (2) a rubber insulating layer was extruded; (3) vulcanization was performed; (4) a spark high-pressure test was performed; (5) the cable was formed; (6) a rubber sheath was extruded; (7) vulcanization was performed; (8) lettering was performed; (9) a finished product was obtained. The rubber compound used for extruding the rubber insulating layer was obtained by the following steps: the temperature of an internal mixer was set to be 90° C. and the rotor speed was set to be 50 r/min, 100 parts of branched polyethylene PER-5 was added, and pre-pressing and mixing were performed for 90 s; 5 parts of zinc oxide and 3 parts of an anti-aging agent RD were added, and mixing was performed for 1 min; then, 200 parts of silane coupling agent modified aluminum hydroxide and 5 parts of paraffin oil SUNPAR2280 were added to the rubber compound, and mixing was performed for 3 min; finally, 3 parts of a crosslinking agent dicumyl peroxide (DCP) and 2 parts of an auxiliary crosslinking agent triallyl isocyanurate (TAIC) were added, mixing was performed for 2 min, and then, the rubber was discharged.

Example 14

The present example is a flame-retardant cable and a production method thereof comprises the following steps:
(1) stranding was performed; (2) a rubber insulating layer was extruded; (3) vulcanization was performed; (4) a spark high-pressure test was performed; (5) the cable was formed; (6) a rubber sheath was extruded; (7) vulcanization was performed; (8) lettering was performed; (9) a finished product was obtained. The rubber compound used for extruding the rubber sheath was obtained by the following processes: the temperature of an internal mixer was set to be 90° C. and the rotor speed was set to be 50 r/min, 100 parts of branched polyethylene PER-5 was added, and pre-pressing and mixing were performed for 90 s; 5 parts of zinc oxide and 3 parts of an anti-aging agent RD were added, and mixing was performed for 1 min; then, 200 parts of silane coupling agent modified aluminum hydroxide, 5 parts of carbon black N550, and 5 parts of paraffin oil SUNPAR2280 were added to the rubber compound, and mixing was performed for 3 min; finally, 3 parts of a crosslinking agent dicumyl peroxide (DCP) and 2 parts of an auxiliary crosslinking agent triallyl isocyanurate (TAIC) were added, mixing was performed for 2 min, and then, the rubber was discharged.

Example 15

The present example is a flame-retardant cool air hose for automobiles, which is an all rubber hose and formed by only one layer of rubber. The used rubber composition and production processes were as follows: the temperature of an internal mixer was set to be 90° C. and the rotor speed was set to be 50 r/min, 100 parts of branched polyethylene PER-5 was added, and pre-pressing and mixing were performed for 90 s; 5 parts of zinc oxide, 2 parts of stearic acid, and 2 parts of an anti-aging agent RD were added, and mixing was performed for 1 min; then, 150 parts of silane coupling agent modified aluminum hydroxide, 5 parts of zinc borate, 10 parts of antimonous oxide, 20 parts of methacrylic acid, 100 parts of carbon black N550, 30 parts of calcined clay, and 30 parts of paraffin oil SUNPAR2280 were added to the rubber compound, and mixing was performed for 3 min; finally, 8 parts of a crosslinking agent dicumyl peroxide (DCP), 4 part of an auxiliary crosslinking agent triallyl isocyanurate (TAIC), and 0.2 part of sulfur were added, mixing was performed for 2 min, and then, the rubber was discharged; the rubber mix was put into an extruder so as to be extruded, and then, the extruded product was vulcanized in a nitrogen-filled vulcanization tank to obtain the flame-retardant cool air hose for automobiles.

Example 16

The present example is a flame-retardant sealing strip, and a production method thereof comprises the following steps:
(1) mixing: the temperature of an internal mixer was set to be 90° C. and the rotor speed was set to be 50 r/min, 100 parts of branched polyethylene PER-3 was added, and pre-pressing and mixing were performed for 90 s; 3 parts of zinc oxide, 1 part of stearic acid, and 2 parts of an anti-aging agent RD were added, and mixing was performed for 1 min; then, 160 parts of silane coupling agent modified aluminum hydroxide, 5 parts of zinc borate, 10 parts of antimonous oxide, 40 parts of carbon black N550, 20 parts of calcined clay, and 20 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged; the rubber mix was automatically discharged to a double screw extruder so as to be extruded into a sheet, the rubber mix was continuously cooled in a rubber sheet cooling machine, and the rubber mix was automatically discharged to a pallet so as to be packaged and formed after the rubber mix was cooled to room temperature;
(2) extrusion and vulcanization: in extrusion and vulcanization processes, a vacuumizing extruder was preferably used, wherein the head temperature of the extruder was set to be 90 to 100° C., the screw temperature was set to be 70 to 80° C., the head pressure was controlled at 15 to 20 MPa, and the rotation speed of the extruder was 25 to 30 r/min; a salt bath vulcanization process was used, wherein the temperature of a spraying section was 250° C., the temperature of a steeping section was 220° C., the temperature of a steeping press section was 220° C., the transmission speed was 35 to 45 m/min, and the temperature of a cooling section was 25 to 30° C.; the flame-retardant sealing strip was obtained.

Example 17

For a high-temperature-resistant flame-retardant conveyor belt, a belt core tensile canvas is arranged between the working surface covering rubber and the non-working surface covering rubber, and the working surface covering rubber, the belt core tensile canvas, and the non-working surface covering rubber were formed into a firm whole by means of forming and vulcanization processes. The components and proportions of the working surface covering rubber in the examples of the present invention were metered by parts:

(1) rubber mixing process:

the temperature of an internal mixer was set to be 90° C. and the rotor speed was set to be 50 r/min, 100 parts of branched polyethylene PER-5 was added, and pre-pressing and mixing were performed for 90 s; 5 parts of zinc oxide, 2 parts of stearic acid, and 2 parts of an anti-aging agent RD were added, and mixing was performed for 1 min; then, 60 parts of silane coupling agent modified aluminum hydroxide, 80 parts of carbon black N550, 30 parts of calcined clay, and 15 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged;

(2) calendering process:

the rubber mix was put into a screw extruder so as to be subjected to hot milling, then, the rubber mix was conveyed into a calender so as to be calendered, and then, a sheet was discharged for later use; the thickness of the rubber sheet was controlled to be 4.5 to 12 mm in the processes of calendering and discharging the sheet; after the sheet was discharged, the temperature of the sheet was kept for later use;

(3) forming process:

the rubber sheet and a preformed rubberized canvas belt blank were closely attached together on a forming machine to form a belt blank of a high-temperature-resistant flame-retardant conveyor belt, the belt blank was coiled, and after 4 h, the coiled belt blank was vulcanized;

(4) vulcanization process:

the formed belt blank of the conveyor belt was put into a press vulcanizer so as to be vulcanized in sections, wherein for each plate, the vulcanization time was 25 min, the vulcanization pressure was 3 MPa, and the vulcanization temperature was 160° C.;

(5) trimming and inspecting:

after vulcanization, trimming and inspecting were performed, and then, packaging and warehousing were performed.

Example 18

The present example is a flame-retardant waterproof coil, and a production method thereof comprises the following steps:

(1) mixing: the temperature of an internal mixer was set to be 90° C. and the rotor speed was set to be 50 r/min, 100 parts of branched polyethylene PER-4 was added, and pre-pressing and mixing were performed for 90 s; 5 parts of zinc oxide, 2 parts of stearic acid, and 2 parts of an anti-aging agent RD were added, and mixing was performed for 1 min; then, 40 parts of silane coupling agent modified aluminum hydroxide, 40 parts of carbon black N550, 30 parts of calcined clay, and 15 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged; a blocky rubber compound was conveyed into an open mill so as to be mixed, the roller temperature was controlled to be between 85° C. and 95° C., the roller spacing was controlled to be less than 1 mm, the rubber compound was plasticated at least four times until the surface of the rubber compound was smooth, uniform and glossy, then, the rubber compound was further mixed and plasticated at least four times, the roller spacing was adjusted to be not greater than 8 mm, mixing was performed three times to obtain a uniformly-mixed rubber compound rough sheet of which the thickness was less than 8 mm, the sheet was cooled to 50° C. or below, and then, the sheet was discharged and stacked;

(2) hot milling: hot milling was performed on the uniformly-mixed rubber compound rough sheet on an open mill, the roller temperature was controlled to be between 85° C. and 95° C., the roller spacing was controlled to be less than 6 mm until the rubber compound sheet was smooth and uniform, and then, the sheet was preliminarily coiled;

(3) calendering: the rubber compound sheet which was preliminarily coiled by means of hot milling was put on a calender, and the roller spacing was adjusted according to the thickness requirement of a finished product to perform calendering so as to obtain a semi-finished coil meeting the thickness specification requirement of the finished product;

(4) coiling: an isolation liner layer was sandwiched according to the specification length requirement of the finished coil, and the semi-finished coil was tidied into a coil;

(5) vulcanization: the coil which was tidied into a coil was put into a vulcanization kettle so as to be vulcanized, the temperature of the vulcanization kettle was controlled to be between 155° C. and 165° C., the pressure of the vulcanization kettle was controlled to be 20 MPa and 50 MPa, and vulcanization was performed for 25 to 30 min;

(6) recoiling: the vulcanized coil was uncoiled again, the isolation liner layer was taken out, and then, the coil was recoiled and packaged to obtain a product.

Example 19

The present example is a flame-retardant damping rubber gasket, and a production method thereof comprises the following steps:

(1) mixing: the temperature of an internal mixer was set to be 100° C. and the rotor speed was set to be 50 r/min, 100 parts of branched polyethylene PER-10 was added, and pre-pressing and mixing were performed for 90 s; 8 parts of zinc oxide, 1.5 parts of stearic acid, 1 part of an anti-aging agent RD, and 1 part of an anti-aging agent MB were added, and mixing was performed for 1 min; then, 100 parts of zinc stearate modified aluminum hydroxide, 5 parts of zinc borate, 10 parts of antimonous oxide, 2 parts of a silane coupling agent (A-172), 30 parts of calcined clay, and 35 parts of paraffin oil SUNPAR2280 were added to the rubber compound, and mixing was performed for 3 min; finally, 3 parts of a crosslinking agent dicumyl peroxide (DCP), 0.3 part of sulfur, and 1.2 parts of an auxiliary crosslinking agent triallyl isocyanurate (TAIC) were added, mixing was performed for 2 min, and then, the rubber was discharged; the rubber mix was plasticated on an open mill of which the roller temperature was 75° C. to obtain a sheet of which the thickness was about 2.5 mm, the sheet was unloaded, and the sheet was allowed to stand for 20 h;

(2) forming: the mixed rubber sheet was calendered and attached to obtain a semi-finished product of which the thickness was slightly higher than the required specification;

(3) vulcanization: mold pressing vulcanization was performed for 15 min at 170° C., and the mold was opened to take out vulcanized rubber;

(4) the vulcanized rubber was trimmed, and then, was packaged and warehoused.

Example 20

The present example is a flame-retardant sealing strip and a production method thereof comprises the following steps:

(1) mixing: the temperature of an internal mixer was set to be 90° C. and the rotor speed was set to be 50 r/min, 100 parts of branched polyethylene PER-11 was added, and pre-pressing and mixing were performed for 90 s; 3 parts of zinc oxide, 1 part of stearic acid, 1 part of an anti-aging agent RD, and 1 part of an anti-aging agent MB were added, and mixing was performed for 1 min; then, 160 parts of silane coupling agent modified aluminum hydroxide, 5 parts of zinc borate, 10 parts of antimonous oxide, 40 parts of carbon black N550, 20 parts of calcined clay, and 60 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged; the rubber mix was automatically discharged to a double screw extruder so as to be extruded into a sheet, the rubber mix was continuously cooled in a rubber sheet cooling machine, and the rubber mix was automatically discharged to a pallet so as to be packaged and formed after the rubber mix was cooled to room temperature;

(2) extrusion and vulcanization: in extrusion and vulcanization processes, a vacuumizing extruder was preferably used, wherein the head temperature of the extruder was set to be 90 to 100° C., the screw temperature was set to be 70 to 80° C., the head pressure was controlled at 15 to 20 MPa, and the rotation speed of the extruder was 25 to 30 r/min; a salt bath vulcanization process was used, wherein the temperature of a spraying section was 250° C., the temperature of a steeping section was 220° C., the temperature of a steeping press section was 220° C., the transmission speed was 35 to 45 m/min, and the temperature of a cooling section was 25 to 30° C.; the flame-retardant sealing strip was obtained.

Example 21

For a high-temperature-resistant flame-retardant conveyor belt, a belt core tensile canvas is arranged between the working surface covering rubber and the non-working surface covering rubber, and the working surface covering rubber, the belt core tensile canvas, and the non-working surface covering rubber were formed into a firm whole by means of forming and vulcanization processes. The components and proportions of the working surface covering rubber in the examples of the present invention were metered by parts:

(1) rubber mixing process:

the temperature of an internal mixer was set to be 90° C. and the rotor speed was set to be 50 r/min, 100 parts of branched polyethylene PER-12 was added, and pre-pressing and mixing were performed for 90 s; 5 parts of zinc oxide, 2 parts of stearic acid, 1 part of an anti-aging agent RD, and 1 part of an anti-aging agent MB were added, and mixing was performed for 1 min; then, 70 parts of silane coupling agent modified aluminum hydroxide, 40 parts of carbon black N550, 20 parts of calcined clay, and 25 parts of paraffin oil SUNPAR2280 were added to the rubber compound, and mixing was performed for 3 min; finally, 3 parts of a crosslinking agent dicumyl peroxide (DCP), 1 part of an auxiliary crosslinking agent triallyl isocyanurate (TAIC), and 0.2 part of sulfur were added, mixing was performed for 2 min, and then, the rubber was discharged;

(2) calendering process:

the rubber mix was put into a screw extruder so as to be subjected to hot milling, then, the rubber mix was conveyed into a calender so as to be calendered, and then, a sheet was discharged for later use; the thickness of the rubber sheet was controlled to be 4.5 to 12 mm in the processes of calendering and discharging the sheet; after the sheet was discharged, the temperature of the sheet was kept for later use;

(3) forming process:

the rubber sheet and a preformed rubberized canvas belt blank were closely attached together on a forming machine to form a belt blank of a high-temperature-resistant flame-retardant conveyor belt, the belt blank was coiled, and after 4 h, the coiled belt blank was vulcanized;

(4) vulcanization process:

the formed belt blank of the conveyor belt was put into a press vulcanizer so as to be vulcanized in sections, wherein for each plate, the vulcanization time was 25 min, the vulcanization pressure was 3 MPa, and the vulcanization temperature was 160° C.;

(5) trimming and inspecting:

after vulcanization, trimming and inspecting were performed, and then, packaging and warehousing were performed.

What is claimed is:

1. A rubber composition, comprising a rubber matrix and essential components, wherein, based on 100 parts by weight of said rubber matrix, the rubber matrix comprises:
 a branched polyethylene with a content represented as A, in which 0<A≤100 parts, and
 an EPM and/or an EPDM with a total content represented as B, in which 0≤B<100 parts;
 wherein the essential components comprise, based on 100 parts by weight of the rubber matrix, 1.5 to 10 parts of a crosslinking agent and 40 to 300 parts of a flame-retardant agent; and
 wherein the branched polyethylene comprises an ethylene homopolymer having a degree of branching of from 60 to 105 branches/1000 carbon atoms, a weight average molecular weight of from 268,000 to 518,000, and a Mooney viscosity ML(1+4) at 125° C. of from 42 to 102.

2. The rubber composition according to claim 1, wherein 10≤A≤100 parts, and wherein 0≤B≤90 parts.

3. The rubber composition according to claim 1, wherein, the crosslinking agent comprises at least one of a peroxide crosslinking agent and sulfur, and the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

4. The rubber composition according to claim 1, wherein, based on 100 parts by weight of the rubber matrix, the content of the flame-retardant agent is 60 to 200 parts.

5. The rubber composition according to claim 1, wherein, the flame-retardant agent comprises at least one of aluminum hydroxide, magnesium hydroxide, zinc borate, antimonous oxide, zinc stearate, titanate, decabromodiphenyl oxide, silane coupling agent modified hydroxide, and red phosphorus.

6. The rubber composition according to claim 1, wherein the flame-retardant agent comprises at least one of nano aluminum oxide, nano magnesium hydroxide, silane coupling agent modified nano hydroxide, and microencapsulated red phosphorus.

7. The rubber composition according to claim 1, further comprising auxiliary components, wherein, based on 100 parts by weight of the rubber matrix, the auxiliary components comprise 0.2 to 10 parts of an auxiliary crosslinking agent, 10 to 150 parts of a reinforcing filler, 5 to 80 parts of a plasticizer, 1 to 3 parts of a stabilizer, 2 to 10 parts of a metal oxide, 1 to 2 parts of a silane coupling agent, 1 to 100 parts of unsaturated carboxylic acid, and 0 to 3 parts of a vulcanization accelerator.

8. The rubber composition according to claim 7, wherein, the auxiliary crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene)acetone, 1,2-polybutadiene, a metal salt of unsaturated carboxylic acid, and sulfur; the reinforcing filler comprises at least one of carbon black, silica, calcium carbonate, talcum powder, calcined clay, and magnesium carbonate, and the calcined clay is zinc stearate or titanate or silane coupling agent modified calcined clay; the plasticizer comprises at least one of pine tar, engine oil, naphthenic oil, paraffin oil, coumarone, stearic acid, and paraffin;
the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB); the metal oxide comprises at least one of zinc oxide, magnesium oxide, and calcium oxide; the silane coupling agent comprises at least one of vinyl tris(2-methoxyethoxy) silane (A-172), γ-glycidyloxypropyl trimethoxysilane (A-187), and γ-mercaptopropyl trimethoxysilane (A-189);
the unsaturated carboxylic acid comprises at least one of methacrylic acid, acrylic acid, and undecylenic acid; the vulcanization accelerator comprises at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazolesulfenamide, bismaleimide, and ethylene thiourea.

9. A flame-retardant wire, comprising a conductor and an insulating layer, wherein, the rubber compound used for the insulating layer comprises the rubber composition according to claim 1.

10. A flame-retardant cable, comprising a conductor, an insulating layer, and a sheath layer, wherein, the rubber compound used for at least one of the insulating layer and the sheath layer comprises the rubber composition according to claim 1.

11. A flame-retardant rubber product, wherein, the rubber compound used for said flame-retardant rubber product comprises the rubber composition according to claim 1.

12. The flame-retardant rubber product according to claim 11, wherein, said flame-retardant rubber product is a flame-retardant cool air hose for automobiles, wherein, the rubber compound used comprises said rubber composition.

13. The flame-retardant rubber product according to claim 11, wherein, said flame-retardant rubber product is a flame-retardant sealing strip, wherein, the rubber compound used for said flame-retardant sealing strip comprises said rubber composition.

14. The flame-retardant rubber product according to claim 11, wherein, said flame-retardant rubber product is a flame-retardant conveyor belt with working surface covering rubber and non-working surface covering rubber, the rubber compound used for at least one of which comprises said rubber composition.

15. The flame-retardant rubber product according to claim 11, wherein, said flame-retardant rubber product is a flame-retardant waterproof coil, wherein, the rubber compound used for said flame-retardant waterproof coil comprises said rubber composition.

16. The flame-retardant rubber product according to claim 1, wherein, the flame-retardant agent comprises zinc stearate.

17. The flame-retardant rubber product according to claim 1, wherein, the flame-retardant agent comprises silane coupling agent modified hydroxide.

18. The flame-retardant rubber product according to claim 1, wherein, the flame-retardant agent comprises silane coupling agent modified aluminum hydroxide.

19. The flame-retardant rubber product according to claim 1, wherein, the flame-retardant agent comprises red phosphorus.

20. The flame-retardant rubber product according to claim 1, wherein, the flame-retardant agent comprises decabromodiphenyl oxide.

* * * * *